(12) United States Patent
Uttendorf et al.

(10) Patent No.: US 12,162,064 B2
(45) Date of Patent: Dec. 10, 2024

(54) CORE FOR A VALVE HOUSING, AND METHOD FOR PRODUCING THE CORE

(71) Applicant: Robert Bosch GmbH, Stuttgart (DE)

(72) Inventors: Sarah Uttendorf, Hannover (DE); Rudolf Janousch, Rechtenbach (DE); Philipp Bergmann, Lohr am Main (DE); Stefan Semrau, Lohr am Main (DE); Christoph Wirzberger, Partenstein (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 17/631,656

(22) PCT Filed: Aug. 10, 2020

(86) PCT No.: PCT/EP2020/072345
§ 371 (c)(1),
(2) Date: Jan. 31, 2022

(87) PCT Pub. No.: WO2021/032516
PCT Pub. Date: Feb. 25, 2021

(65) Prior Publication Data
US 2022/0266330 A1 Aug. 25, 2022

(30) Foreign Application Priority Data
Aug. 16, 2019 (DE) ...................... 10 2019 212 283.3

(51) Int. Cl.
*B22C 9/10* (2006.01)
*B22C 9/24* (2006.01)
(Continued)

(52) U.S. Cl.
CPC ................ *B22C 9/103* (2013.01); *B22C 9/24* (2013.01); *B33Y 80/00* (2014.12); *F16K 27/041* (2013.01)

(58) Field of Classification Search
CPC ......... B22C 9/103; F16K 27/00; B33Y 10/00; B33Y 80/00
See application file for complete search history.

(56) References Cited

U.S. PATENT DOCUMENTS
2019/0084218 A1  3/2019  Rauch et al.

FOREIGN PATENT DOCUMENTS
CN  108994257 A  * 12/2018
CN  109128010 A    1/2019
DE  10 2018 204 244 A1  6/2019

OTHER PUBLICATIONS
Machine Translation of Kocel (CN 109128010 A, published Jan. 4, 2019, cited in IDS filed Jan. 31, 2022). (Year: 2019).*
(Continued)

*Primary Examiner* — Kevin E Yoon
*Assistant Examiner* — Jacky Yuen
(74) *Attorney, Agent, or Firm* — Maginot, Moore & Beck LLP

(57) ABSTRACT

A core for casting a valve housing includes at least one first core part which is additively produced, and at least one second core part which is produced without using additive production. The at least one first core part represents at least one pressure chamber or at least one pressure medium channel of the housing which is configured to provide a fluidic connection of a pressure medium source to a pressure medium consumer when the housing is formed using the core. At least one frame-shaped core holder is formed by a first of the at least one second core part when the housing is formed using the core.

6 Claims, 3 Drawing Sheets

(51) Int. Cl.
    *B33Y 80/00*     (2015.01)
    *F16K 27/04*     (2006.01)

(56) References Cited

OTHER PUBLICATIONS

Machine Translation of Bosch(DE 10 2018 204 244 A1, published Jun. 27, 2019, cited in IDS filed Jan. 31, 2022). (Year: 2019).*
International Search Report corresponding to PCT Application No. PCT/EP2020/072345, mailed Oct. 20, 2020 (German and English language document) (7 pages).
Ederer, Ingo; et al.; "3D-Druck: Voxeljet beschleunigt Gussprozesse aller Art", Abschnitt "Kombination aus 3D-gedruckten Kernen und klassischem Formanbau", Schweizer MaschinenMarkt, May 29, 2017, pp. 1-6.

* cited by examiner

CORE FOR A VALVE HOUSING, AND METHOD FOR PRODUCING THE CORE

This application is a 35 U.S.C. § 371 National Stage Application of PCT/EP2020/072345, filed on Aug. 10, 2020, which claims the benefit of priority to Serial No. DE 10 2019 212 283.3, filed on Aug. 16, 2019 in Germany, the disclosures of which are incorporated herein by reference in their entirety.

The disclosure relates to a core, in particular for the casting, of a valve housing, and to a method for the production thereof.

BACKGROUND

For the casting of a valve housing, a core, in particular a sand core, is required in order to form the necessary internal hollow structures, such as pressure chambers, in particular pressure medium channels. Particularly in the case of complex channel geometries, the production of the sand core by means of conventional methods is complicated and, especially if the sand core has to be composed of many individual parts, can lead to poorer tolerances and to increased production costs.

Conventional methods for producing cores or core parts are, for example, a core shooting method or manual production in core boxes, referred to as a cold-box core method. In the recent past, the 3D sand printing process, i.e. additive production of the core, has been added.

With the core shooting method, there are limits on the complexity of the housing geometries which can be achieved. Moreover, this method is not economical in the case of individual piece numbers owing to high tool costs. The advantage of comparatively low costs at higher piece numbers is counteracted by the disadvantages of a comparatively high number of joints and core-division and ejector marks.

By means of the additive production method, in contrast, complex and optimized geometries can be produced in just one production step. However, the comparatively high costs, which are dependent on the tool costs and the piece number, are disadvantageous.

Given this situation, the object underlying the disclosure is that of providing a high-quality yet low-cost core for a valve housing. Furthermore, the object underlying the disclosure is that of providing a method for producing the core which satisfies the same requirements as regards quality and costs.

SUMMARY

The first object is achieved by means of a core having at least some of the features disclosed herein, and the second object is achieved by means of a method for producing the core having at least some of the features disclosed herein.

Advantageous developments of the respective disclosure are described herein.

A core, in particular a sand core, for casting a valve housing has a plurality of core parts. At least one of the core parts is additively produced, that is to say produced by means of an additive production process. In the following, a core part produced in this way is referred to as a first core part. In this context, at least one other of the core parts is produced in a non-additive manner and is referred to below as a second core part. Non-additive production, such as by means of a core shooting method or a cold-box core method, is referred to below as an alternative production method. In the case of a plurality of second core parts, it may be that only one alternative production method or various alternative production methods have been used. In particular, the differently produced core parts have different material compositions and/or microstructures owing to the different production methods. According to the disclosure, the first core part/s represents/represent at least one pressure chamber, in particular pressure medium channel, of the housing which is provided for the fluidic connection of a pressure medium source to a pressure medium consumer. In particular, this is a pressure chamber, in particular a pressure medium channel, which must meet high requirements in respect of the smallest possible pressure loss, and which must therefore be designed to be geometrically optimized in terms of flow, for which additive production is particularly well-suited on account of its, in principle unlimited, design possibilities. In particular, this is a pressure chamber, in particular a pressure medium channel, which is provided for fluidic connection to a pump or a working connection of the housing, that is to say one of the so-called P, A, B or main connections or channels of the housing. In contrast, according to the disclosure, at least one, in particular frame-shaped, core holder is formed by the second core part/s produced by an alternative method. In particular, the section of the core formed or the section of the housing represented by the second core part/s must meet no or comparatively low requirements in respect of the smallest possible pressure loss. The alternative production methods mentioned are once again suitable for this purpose.

As a result of the assignment according to the disclosure of the additive production method and of the alternative production method/s to the abovementioned core parts, it is possible to provide a multi-part core for the housing of a valve, in particular a directional control valve, with high quality, in particular with low pressure loss, and yet low costs.

In this case, the additive production of the first core part/s has great advantages. Thus, finish-machining is not absolutely necessary. The criterion of demoldability of the core part, which has to be taken into account particularly in the case of the core shooting method, is eliminated, simplifying the design of the core part and, in addition, allowing high volume utilization since no draft angles have to be provided. Moreover, undercuts can be produced without problems. Since a smaller number of core parts is possible, joints can be omitted, which increases tolerances overall and reduces core shift. Moreover, the number of core-division and ejector marks of the core can be reduced.

In a further development, the second core part/s, in particular the core holder, represents/represent at least one pressure chamber, in particular pressure medium channel, of the housing which is provided for fluidic connection to a pressure medium sink, since such a pressure chamber, in particular pressure medium channel, has comparatively low requirements in respect of the smallest possible pressure loss.

The core can be configured in such a way that only one of the core parts or that a plurality of core parts is produced additively, or by an alternative method.

In a further development, division of the core into the core parts and their assignment to the respective production method is optimized according to core production costs, in particular according to core tool costs and the number of pieces, and according to a core-dependent functionality of the housing, in particular according to compressive strength and/or flow resistance and/or pressure loss.

Alternatively or in addition, division and assignment are optimized in such a way that the core part or core parts with high volume utilization is or are produced additively, and that the core part or core parts with comparatively low volume utilization is or are produced by an alternative method.

In this context, volume utilization can be defined as the material volume of the core part based on its smallest, in particular cuboid, envelope volume into which it still fits. In the case of the additively produced first core parts, the cuboid extends with a base side parallel to a base plate on which it can be produced.

Alternatively or in addition, division and assignment are optimized in such a way that the core part or core parts with a comparatively low piece number is or are produced additively, and that the core part or core parts with a comparatively high piece number is or are produced by an alternative method.

In a preferred further development, all the pressure chambers, in particular pressure medium channels, of the housing which are provided for fluidic connection to the pressure medium sink are represented exclusively by the second core part/s.

In a preferred further development, all the pressure chambers, in particular pressure medium channels, of the housing which are provided for the fluidic connection of the pressure medium source to the pressure medium consumer are represented exclusively by the first core part/s.

In a preferred further development, by virtue of the abovementioned suitability of the additive production method for producing flow-optimized geometries, the first core part/s furthermore represents/represent a recess of the housing to accommodate at least some section or sections of a valve body. In particular, it is possible in this case for at least the fluidic connection of the pressure medium source to the pressure medium consumer to be controlled via this recess, in particular via its cooperation with the valve body.

In a preferred further development, the second core part/s represents/represent an extension to the recess, in particular in the longitudinal direction thereof, in particular in a direction of movement of the valve body. In this case, in particular, at least the fluidic connection of the pressure medium sink can be controlled via the extension, in particular via its interaction with the valve body.

In a further development, the extension extends on one side of the recess. Alternatively, it extends on both sides of the recess with in each case at least one extension section.

In a further development, the extension sections are formed in a manner connected via a connecting section, in particular connected via a link.

In a further development, the extension is represented by the core holder, or the extension and the connecting section, in particular the link, are represented by the core holder.

In a further development, the first core part/s represents/represent at least one pressure chamber or pressure medium channel of the housing which is provided for the purpose of indicating a load pressure or actuating pressure or control pressure. In this case, each such pressure chamber or pressure medium channel can be represented by a dedicated first core part, or two or more of them are represented jointly by one of the first core parts.

In a further development, all the pressure chambers and/or pressure medium channels of the housing, in particular all the main channels, are represented by the core parts, in particular by the core holder and the other core part/s.

In a further development, the core holder and the core part/s arranged thereon have connecting sections or joining sections which are designed to match one another, via which they are connected and/or joined to one another.

In a further development, the core parts are additionally materially connected or joined, in particular adhesively bonded.

In a further development, the arranged core part/s can be positioned or are positioned, in particular in a clearly defined manner, by means of the connecting sections or joining sections.

In a further development, the connecting or joining sections have contact surfaces which are designed to match one another and which are in contact with one another or can be brought into contact with one another.

In a further development, one of the connecting sections or joining sections has a receptacle, and the connecting section or joining section, which is designed in each case to match it, has an insert which can be received or is received.

In a further development, the connecting or joining sections are designed to match one another in a centering and/or clamping manner.

A method for producing a core which is configured according to at least one aspect of the preceding description and which is provided for casting a valve housing has a step of "production of at least one first core part, by which at least one pressure chamber or pressure medium channel of the housing is represented which is provided for the fluidic connection of a pressure medium source to a pressure medium consumer" and "production of at least one second core part, by which at least one core holder is formed". According to the disclosure, only the first core part/s is/are produced additively, whereas the second core part/s is/are produced by an alternative method.

As a result of the assignment according to the disclosure of the additive production step or method and of the alternative production steps or methods to the abovementioned core parts, the method provides a multi-part core for the housing with which high quality can be achieved, in particular in respect of low pressure loss, with low costs, in particular production costs.

In a further development, the at least one first core part is produced in such a way that the already mentioned recess of the housing is represented to accommodate at least some section or sections of the valve body.

In a further development, the at least one second core part is produced in such a way that at least the already mentioned extension to the recess is represented.

In a further development, the at least one first core part is produced in such a way that at least one pressure chamber or pressure medium channel of the housing is represented which is provided for the already mentioned indication of the load pressure or actuating pressure or control pressure.

One exemplary embodiment of a core according to the disclosure and one exemplary embodiment of a method according to the disclosure are illustrated in the drawings. The disclosure is now explained in greater detail with reference to the figures of these drawings.

DETAILED DESCRIPTION

Figure 1:
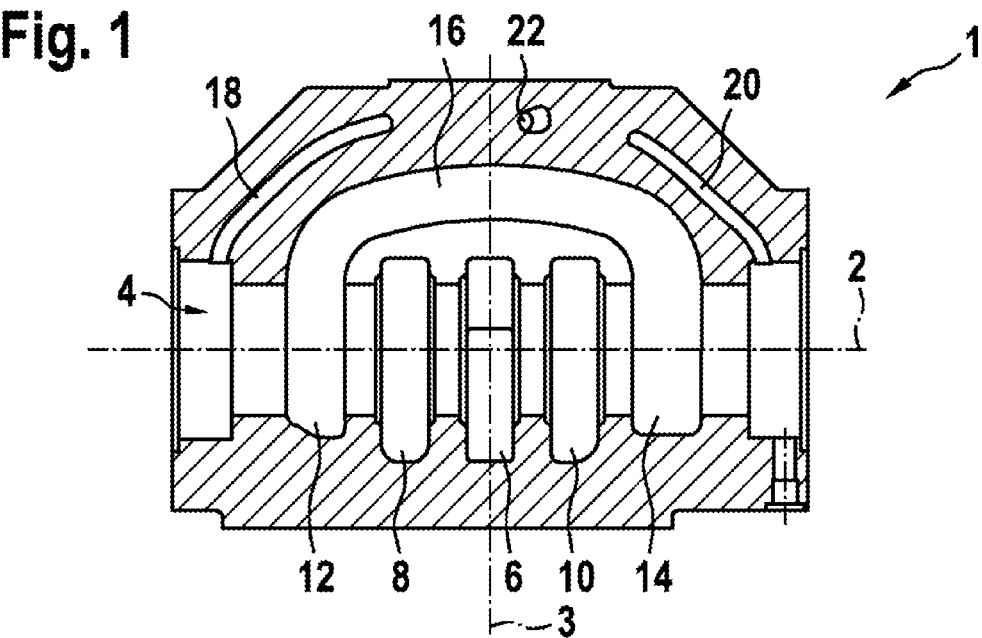
FIG. 1 shows a longitudinal section through a valve housing according to the disclosure in accordance with one exemplary embodiment.

FIG. 1 shows a housing 1, produced according to the disclosure, of a valve designed as a spool valve, which is cast by means of a core according to the disclosure which is of multi-part configuration. In this case, all the pressure chambers or pressure medium channels, which are shown without hatching in FIG. 1, are represented by the core. These are: a recess 4, which extends in the direction of a longitudinal axis 2 and in which a valve body for controlling pressure medium connections can be accommodated in a longitudinally movable manner, a high-pressure chamber 6, which is in pressure medium connection with a pressure medium source, in particular with a pump connection (not illustrated) of the housing 1, two working-pressure chambers 8, 10, which are in pressure medium connection with a respective working connection (not illustrated) of the housing 1, two low-pressure or tank-pressure chambers 12, 14, which are connected by means of a connecting section 16 of link-like design, wherein the low-pressure chamber 12 is connected to a low-pressure or tank connection (not illustrated) of the housing 1, and load-indicating and control-pressure channels 18, 20, 22.

The pressure chambers 6, 8, 10, 12, 14 each extend substantially as radially extended, fully circumferential grooves around the recess 4. The high-pressure chamber 6 is designed to be mirror-symmetrical with respect to a plane of symmetry 3 set perpendicularly to the longitudinal axis 2. The working-pressure chambers 8, 10 are arranged symmetrically with respect to the plane of symmetry 3 on both sides of the high-pressure chamber 6 in the longitudinal direction 2. The same applies to the low-pressure or tank-pressure chambers 12, 14, which are arranged to the outside of the two working-pressure chambers in the longitudinal direction 2. The link 16 is designed to be largely symmetrical with respect to the plane of symmetry 3 and extends over the working-pressure chambers 8, 10 and the high-pressure chamber 6.

In order to simplify the following description of a casting core according to the disclosure, its geometries are designated with the same nomenclature and the same reference numerals as the geometries of the housing which are represented by it. For better differentiation, the reference signs of the core are additionally indexed with one, two or three prime symbols (for example 20', 20'' or 20''').

Figure 2:
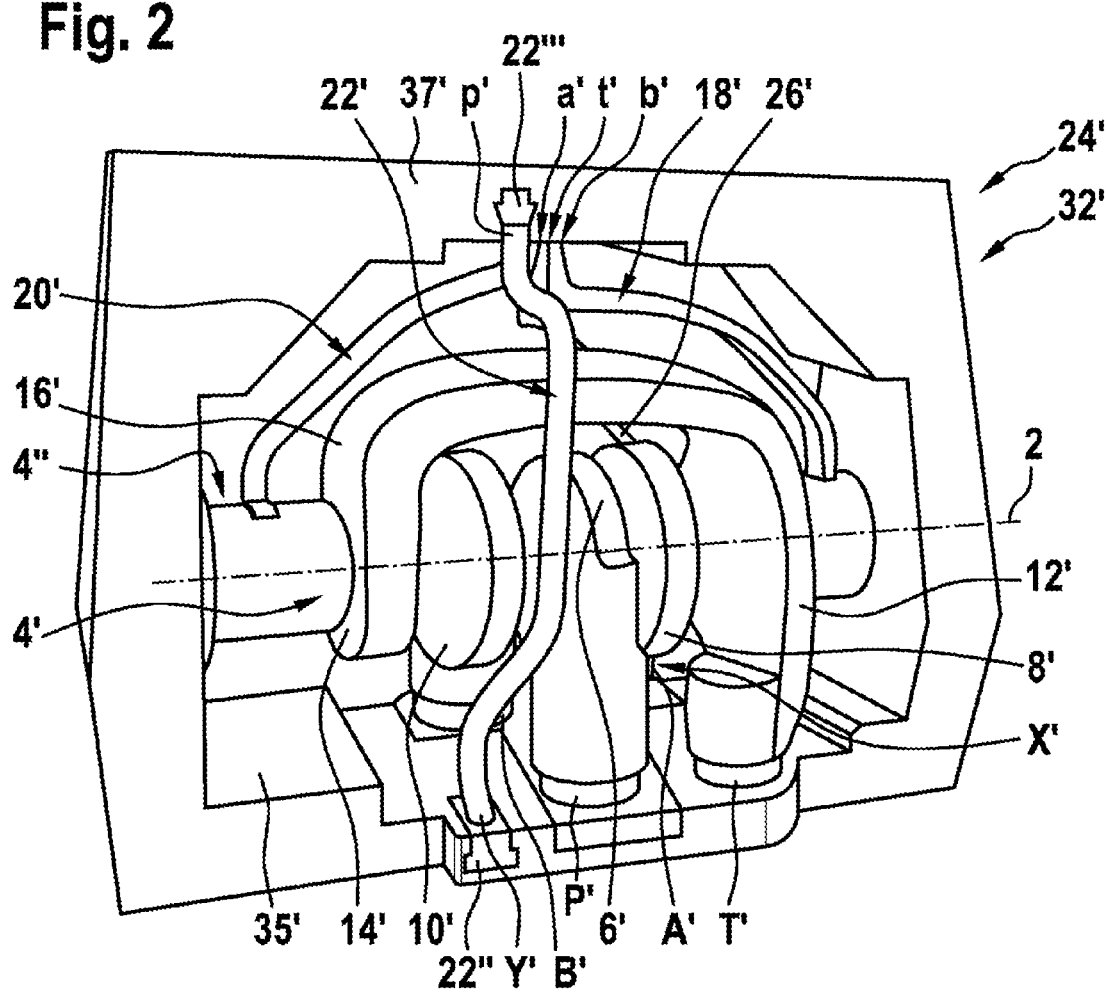
FIG. 2 shows a core according to the disclosure of the housing according to FIG. 1 in a perspective illustration.

Accordingly, FIG. 2 shows an exemplary embodiment of a core 24' according to the disclosure, by means of which the housing 1 is produced according to FIG. 1. Here, the already described geometries 4 to 22 of the housing 1 are represented by the geometries 4' to 22' of the core 24'.

As already mentioned, the pressure chambers 8', 6' and 10' extend in the form of radial extensions of the recess 4' and each open tangentially into a high-pressure connection P' and/or into a working connection A' and B'. According to FIG. 2, the low-pressure chamber 12' is connected to a tank connection T'. The connections P', A', B', T' are in this case arranged on a bottom side 35' of the core 24'.

The channels 22' and 26' each end in control oil connections Y' and X' on the bottom side 35' and in pilot control connections p' and t' on the roof section 37'. They represent control pressure or control oil channels. The connections X' and Y', which are provided for the connection of a control pressure or control oil source, are in this case arranged on the bottom side 35' of the core 24'. The pilot control connections p' and t', which are provided for connecting a pilot control valve, are arranged on the roof section 37' of the core 24'.

The core 24' is divided into different core parts and is made up of these. In particular, those pressure chambers of the housing 1 which, at least in some section or sections, form a pressure medium flow path via which a pressure medium source or hydraulic pump connected to the housing 1 can be connected to the working connections of the housing 1, are in this case to be formed as optimally as possible in terms of flow, with a low pressure loss. In contrast to established production methods for cores, in which their geometric configuration is limited by boundary conditions, such as a necessary demoldability, the additive production method for cores makes it possible to form these geometries in an almost unlimited configuration, and therefore with maximum flow optimization. The pressure chambers or pressure medium channels with these stated high requirements are therefore represented according to the disclosure by core parts of the core which are produced additively. On the other hand, other chambers or channels which, for example, have to meet lower or no requirements with respect to the geometric shaping and the pressure loss, are represented by core parts of the core which are produced by an alternative method, in particular by means of a conventional core shooting or cold-box method.

Figure 4:
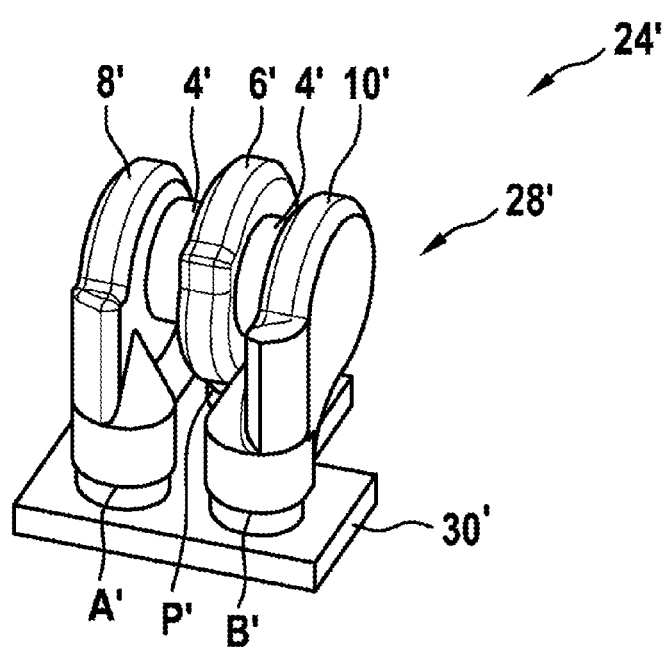
FIG. 4 shows a first core part of the core according to FIG. 2 in a perspective illustration.

FIG. 4 shows a one-piece first core part 28' of the core 24' with the recess 4', the pressure chambers 6', 10', 12' and the connections A', P' and B'. The first core part 28' thus represents pressure chambers 4', 6', 10', 12' and pressure medium channels which contribute to the pressure medium connection of the pressure medium source, represented by the high-pressure connection P', to a consumer, represented by the working-pressure connections A', B'. The pressure medium connections are formed in cooperation with the valve body of the valve from P' via 4' to A' and from P' via 4' to B' and are to be controlled with correspondingly optimized, minimized pressure loss since the latter always has to be provided by an increased pressure level of the pressure medium source, in particular a hydraulic pump. Owing to these requirements, the first core part 28' is produced additively.

The first core part 28' furthermore has a T-shaped base plate 30', in which the working connections A', B' and the high-pressure connection P' are based. The base plate 30' forms a connecting section for insertion into a core holder.

Figure 3:
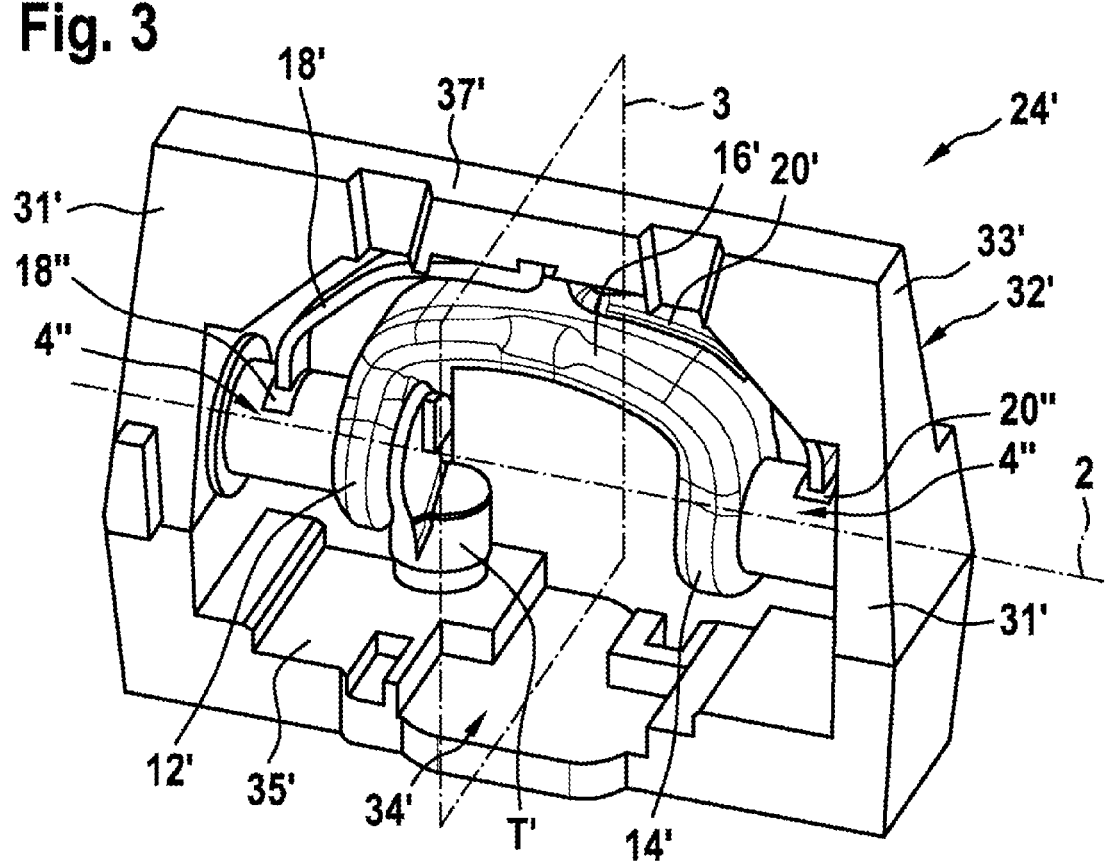
FIG. 3 shows a second core part of the core according to FIG. 2 in a perspective illustration.

FIG. 3 shows this core holder as a frame-shaped second core part 32'. This is formed in one piece from a frame 33', which is closed in the exemplary embodiment. Cylindrical extensions 4'' to the recess 4' extend inward and along the longitudinal axis 2 from the side walls 31' of the frame. The respective extension 4'' is adjoined by the pressure chamber 12' and 14', respectively. These 12', 14' are connected via the link 16', wherein the low-pressure connection T' emerges from the pressure chamber 12' and is based in a bottom section 35' of the frame 33'.

According to FIG. 3, the second core part 32' thus only has pressure chambers which do not have to meet the above-described high requirements for a pressure loss to the same extent. It is therefore produced by an alternative method, i.e. non-additively, by means of a core shooting method.

For positionally accurate insertion of the first core part 28', the second core part 32' according to FIG. 3 has a T-shaped connecting section 34', which is modeled after the base plate 30' of the first core part 28' according to FIG. 4. The latter 30' is, in principle, a T-shaped insert, designed to match the T-shaped connecting section 34', in the form of a recess in the second core part 32'.

According to FIG. 3, in each case one receptacle, in particular in the form of a quarter of a circle, is provided laterally on the inside of the pressure chambers 12', 14', facing the recess 4', as a connecting section for connection to the first core part 28'. This has corresponding projections as connecting sections.

According to FIG. 3, further first core parts 18' and 20' are connected to the core holder 32'. The control or actuating pressure medium channels represented by them have high requirements for a loss-free pressure medium connection of an actuating pressure medium source connected to the housing 1, represented in the exemplary embodiment illustrated by the connections a' and b' (cf. FIG. 2), to an active surface of the valve body provided in the recess 4. In order to be able to meet these requirements by means of an optimally designed channel geometry, the first core parts 18' and 20', as already the first core parts 22', 26' and 28', are also produced additively.

Figure 5:
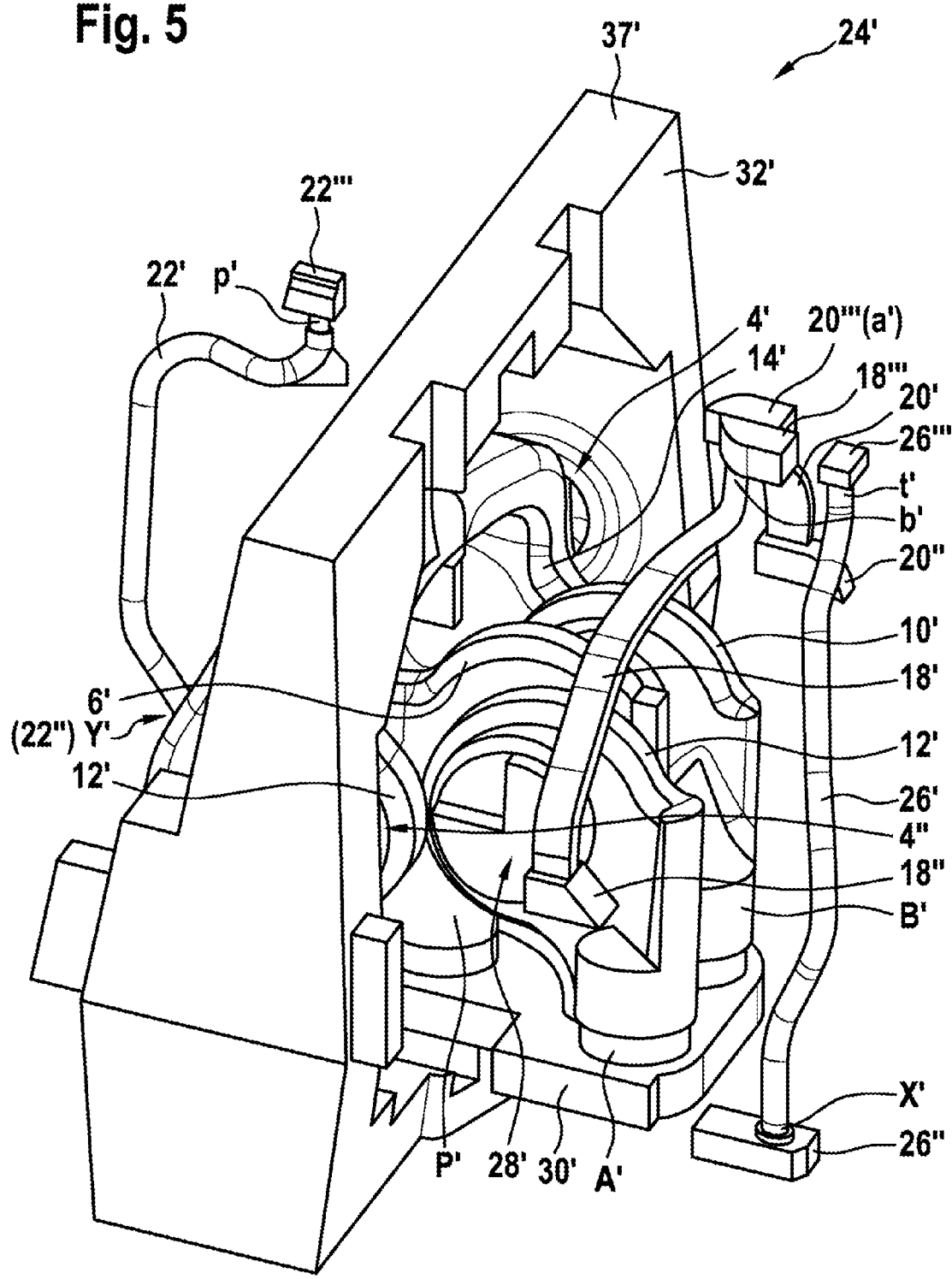
FIG. 5 shows the core according to FIG. 2 in an exploded view.

According to FIGS. 3 and 5, the first core parts 18' and 20' each have, on the side of the respective extension 4", a foot-shaped connecting section 18" or 20" via which they are pushed into a connecting section, designed as a receptacle, of the extension 4". The respective other end section of the first core part 18' or 20' has a foot-shaped connecting section 18"' or 20"', into which the connection a' or b' opens. The foot-shaped connecting sections 18"', 20"' are each pushed into a corresponding recess on the roof section 37' of the frame 33'. The connections a' and b' are thus arranged on the roof section 37' of the frame 33' of the core 24'.

FIG. 5 shows the core 24' with all the already mentioned first core parts 18', 20', 22', 26', 28' and the second core part 32', the core holder, in an exploded view.

A multi-part core is disclosed which represents pressure chambers of a housing of a valve, in particular of a directional control valve configured as a spool valve, wherein, according to the disclosure, at least those of the pressure chambers of the housing via which a pressure medium source can be fluidically connected to a pressure medium consumer with as little loss as possible, in particular with low pressure loss, are represented by an additively produced core part of the core. Other pressure chambers of the housing, which must meet comparatively low requirements in respect of loss or pressure loss, are, on the other hand, produced by an alternative method, that is to say non-additively, that is to say by means of another method.

The invention claimed is:

1. A method for producing a core for casting a valve housing, comprising:
    producing by additive production at least one first core part, the at least one first core part representing at least one first pressure chamber or at least one first pressure medium channel of the housing which is configured to fluidically connect a pressure medium source to a pressure medium consumer when the valve housing is cast using the produced core;
    producing at least one second core part without using additive production, the at least one second core part representing at least one second pressure chamber or at least one second pressure medium channel of the housing which is configured to fluidically connect to a pressure medium sink when the valve housing is cast using the produced core; and
    connecting the produced at least one first core part and the produced at least one second core part.

2. The method as claimed in claim 1, wherein producing by additive production at least one first core part comprises:
    producing by additive production at least one first core part that represents a recess of the housing configured to accommodate at least some section or sections of a valve body when the valve housing is cast using the produced core.

3. The method as claimed in claim 2, wherein producing at least one second core part without using additive production comprises:
    producing at least one second core part without using additive production, wherein the produced at least one second core part represents an extension to the recess.

4. The method as claimed in claim 1, wherein the produced at least one first core part represents at least one first pressure chamber or at least one first pressure medium channel of the housing which is configured to indicate one of a load pressure, an actuating pressure, and a control pressure when the valve housing is cast using the produced core.

5. The method of claim 1, wherein:
    the producing by additive production at least one first core part comprises producing the at least one first core part with at least one recess; and
    producing at least one second core part without using additive production comprises producing the at least one second core part with at least one insert configured to fit within an associated one of the at least one recesses.

6. The method of claim 5, wherein:
    the at least one insert comprises a first and a second insert;
    the first insert is located at a first end portion of the at least one second core part; and
    the second insert is located at a second end portion of the at least one second core part opposite the first end portion.

* * * * *